United States Patent
Feder et al.

(10) Patent No.: US 10,853,773 B2
(45) Date of Patent: Dec. 1, 2020

(54) METHODS AND SYSTEMS FOR CONDUCTING MULTI-USER INTERACTIONS ON A DEVICE USING BIOMETRIC AUTHENTICATION

(71) Applicant: Disney Enterprises, Inc., Burbank, CA (US)

(72) Inventors: David Feder, San Francisco, CA (US); Patrick W. Millegan, Palo Alto, CA (US); Alif Khalfan, Redwood City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1188 days.

(21) Appl. No.: 14/797,783

(22) Filed: Jul. 13, 2015

(65) Prior Publication Data

US 2017/0019401 A1    Jan. 19, 2017

(51) Int. Cl.
| | |
|---|---|
| *G06Q 20/10* | (2012.01) |
| *H04W 12/06* | (2009.01) |
| *G06Q 20/32* | (2012.01) |
| *G06Q 20/40* | (2012.01) |
| *H04L 29/06* | (2006.01) |

(52) U.S. Cl.
CPC ....... *G06Q 20/102* (2013.01); *G06Q 20/3223* (2013.01); *G06Q 20/401* (2013.01); *H04W 12/06* (2013.01); *G06Q 20/40145* (2013.01); *G06Q 2220/00* (2013.01); *H04L 63/0861* (2013.01)

(58) Field of Classification Search
CPC .............. H04L 63/0861; G06Q 20/401; G06Q 20/40145; G06Q 20/3223; G06Q 2220/00; H04W 12/06
See application file for complete search history.

(56) References Cited

U.S. PATENT DOCUMENTS

| | | | |
|---|---|---|---|
| 8,577,803 B2 * | 11/2013 | Chatterjee | G06Q 20/36 705/41 |
| 8,744,965 B2 | 6/2014 | Blanco et al. | |

(Continued)

FOREIGN PATENT DOCUMENTS

WO    WO 2015/032825 A1    3/2015

OTHER PUBLICATIONS

Security, "How Venmo protects your finacial information", Mar. 31, 2015, p. 1-3 https://venmo.com/about/security/.

*Primary Examiner* — Calvin L Hewitt, II
*Assistant Examiner* — Dennis G Keritsis
(74) *Attorney, Agent, or Firm* — Farjami & Farjami LLP

(57) ABSTRACT

There is provided a method for use by a mobile device. The method includes launching a software application requiring an identity verification of each of a plurality of users for performing a requested action, the plurality of users including a first user and a second user, receiving a first biometric information of the first user and a second biometric information of the second user, sending the first biometric information of the first user and the second biometric information of the second user to a server, receiving notifications from the server as to whether the first and second biometric information corresponding to biometric information in first user and second user profiles, respectively, and performing the requested action, if the notifications indicate a match.

10 Claims, 3 Drawing Sheets

(56) References Cited

U.S. PATENT DOCUMENTS

| | | | |
|---|---|---|---|
| 9,633,383 B2* | 4/2017 | Zamer | G06Q 30/04 |
| 9,990,621 B1* | 6/2018 | Ng | G06Q 20/202 |
| 2002/0142844 A1 | 10/2002 | Kerr | |
| 2007/0033414 A1 | 2/2007 | Dunko | |
| 2009/0293111 A1* | 11/2009 | Lai | G06F 21/32 |
| | | | 726/6 |
| 2011/0320353 A1 | 12/2011 | Mehew et al. | |
| 2012/0131657 A1 | 5/2012 | Sunstein et al. | |
| 2012/0143752 A1 | 6/2012 | Wong et al. | |
| 2012/0209749 A1* | 8/2012 | Hammad | G06Q 20/20 |
| | | | 705/27.1 |
| 2013/0036017 A1 | 2/2013 | Galloway | |
| 2013/0231182 A1 | 9/2013 | Hall et al. | |
| 2013/0346309 A1 | 12/2013 | Giori | |
| 2014/0100931 A1* | 4/2014 | Sanchez | G06Q 20/02 |
| | | | 705/14.23 |
| 2014/0136349 A1* | 5/2014 | Dave | G06Q 20/12 |
| | | | 705/16 |
| 2014/0188719 A1 | 7/2014 | Poomachandran et al. | |
| 2014/0207662 A1 | 7/2014 | Isaacson et al. | |
| 2014/0243101 A1 | 8/2014 | Kelly et al. | |
| 2014/0256425 A1 | 9/2014 | Flaherty | |
| 2014/0351130 A1 | 11/2014 | Cheek et al. | |
| 2016/0267448 A1* | 9/2016 | James | G06Q 20/102 |

\* cited by examiner

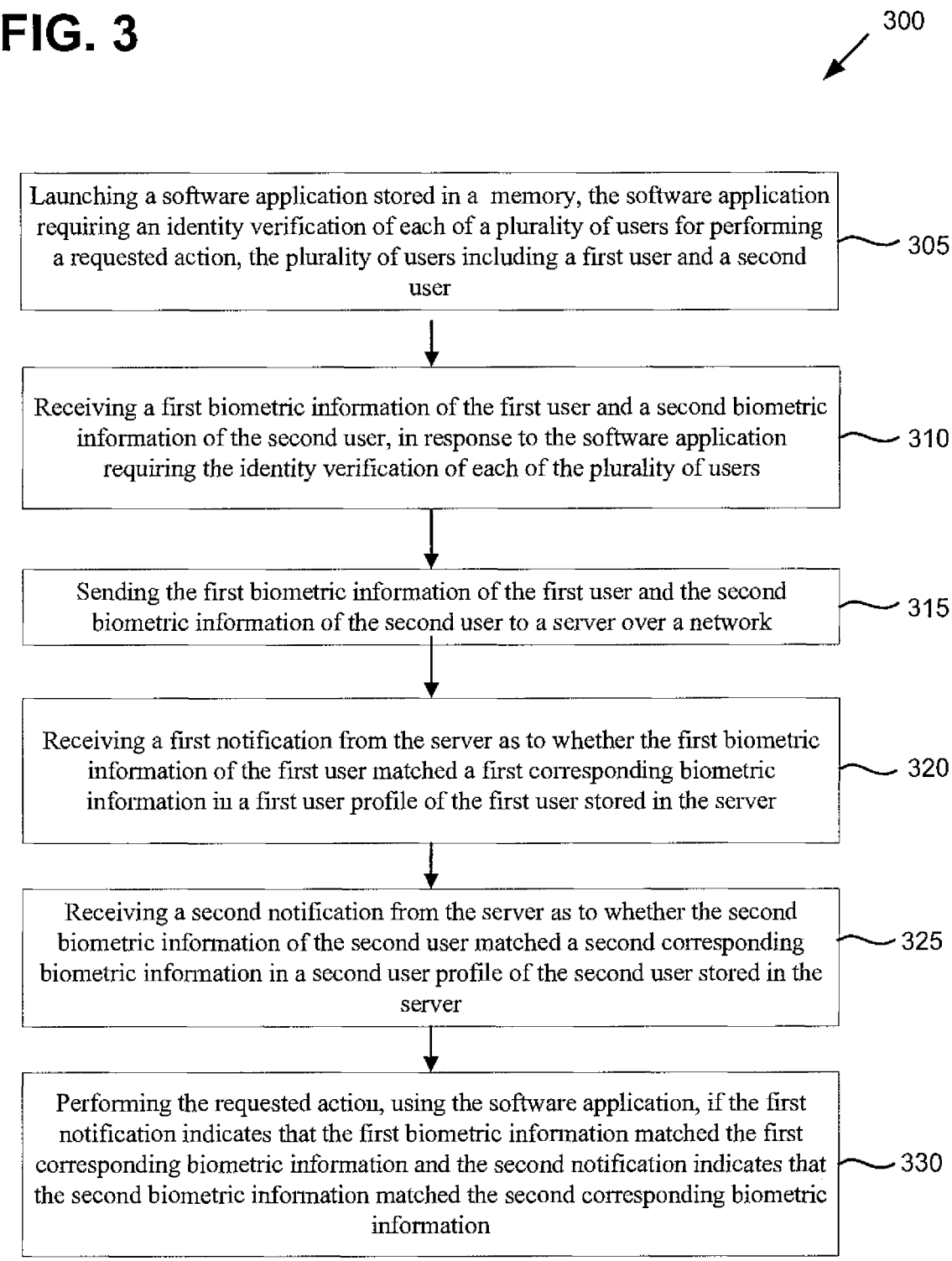

METHODS AND SYSTEMS FOR CONDUCTING MULTI-USER INTERACTIONS ON A DEVICE USING BIOMETRIC AUTHENTICATION

BACKGROUND

As mobile devices become an increasingly central part of people's lives, many common daily interactions are now being handled digitally. These daily interactions may include multiple users using their individual mobile devices to connect with each other using a social networking application, play games using a gaming application, pay a bill using an electronic payment application, etc. All such applications require user authentication, which is a process for validating the identity of a user of a mobile device.

SUMMARY

The present disclosure is directed to methods and systems for conducting multi-user interactions on a device using biometric authentication, substantially as shown in and/or described in connection with at least one of the figures, as set forth more completely in the claims.

BRIEF DESCRIPTION OF THE DRAWINGS

FIG. 3 presents an exemplary flowchart illustrating a method of conducting multi-user interactions on a device using biometric authentication, according to one implementation of the present disclosure.

DETAILED DESCRIPTION

Figure 1:
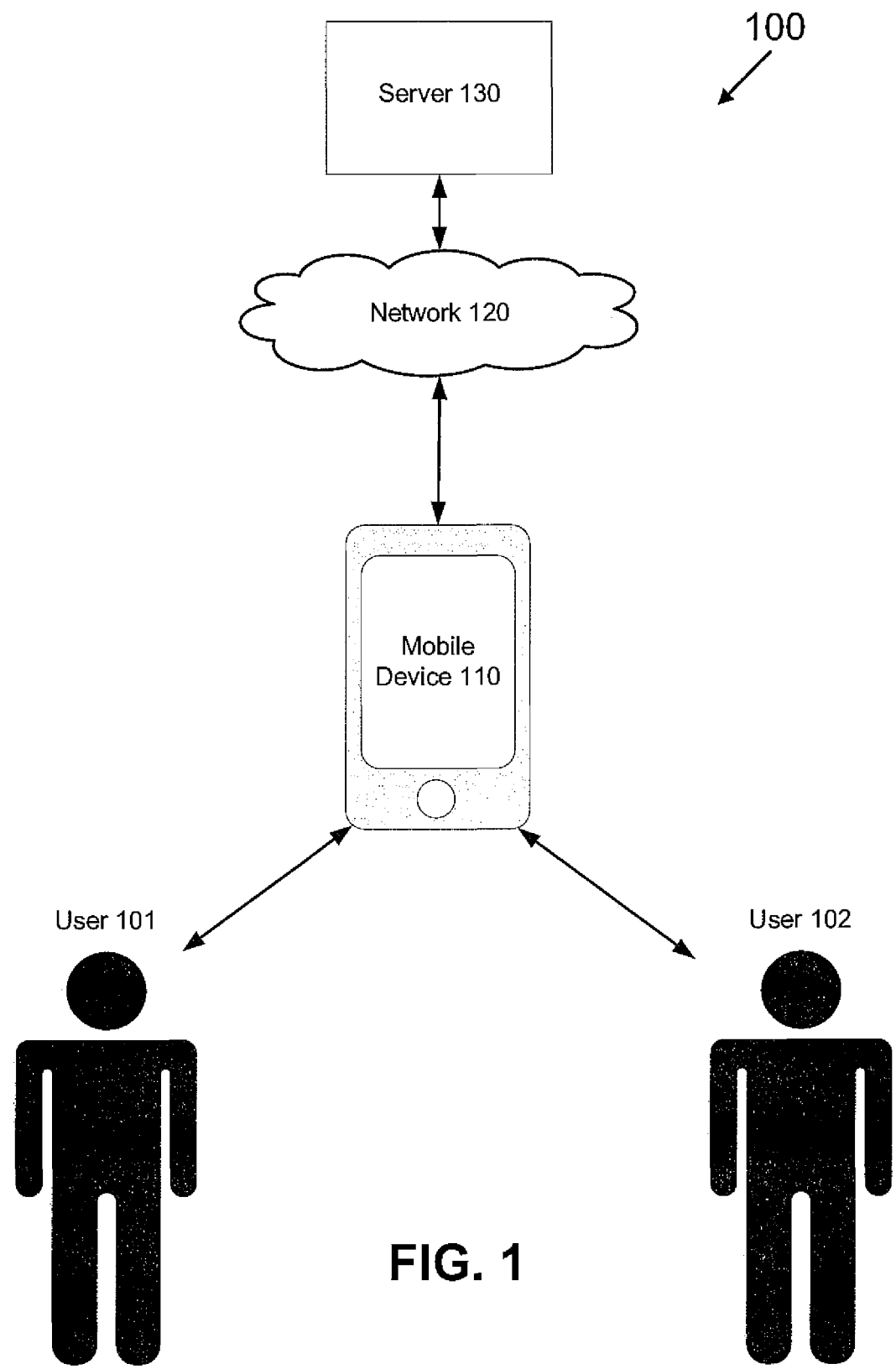
FIG. 1 presents an exemplary diagram of a system for conducting multi-user interactions on a device using biometric authentication, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of exemplary system 100 for conducting multi-user interactions on mobile device 110 using biometric authentication, according to one implementation of the present disclosure. As shown in FIG. 1, system 100 includes mobile device 110, network 120, server 130, user 101, and user 102.

Mobile device 110 may be any user interactive portable computing device, such as a phone, personal digital assistant, tablet, etc. As shown in FIG. 1, user 101 and user 102 may utilize mobile device 110, which is also in communication with server 130 over network 120 to send and receive information. Network 120 may correspond to a network connection, such as a wireless phone service communication network, broadband network, or other network capable of sending or receiving data. Server 130 may be a server suitable for storing information as well as communicating information with mobile device 110.

Figure 2:
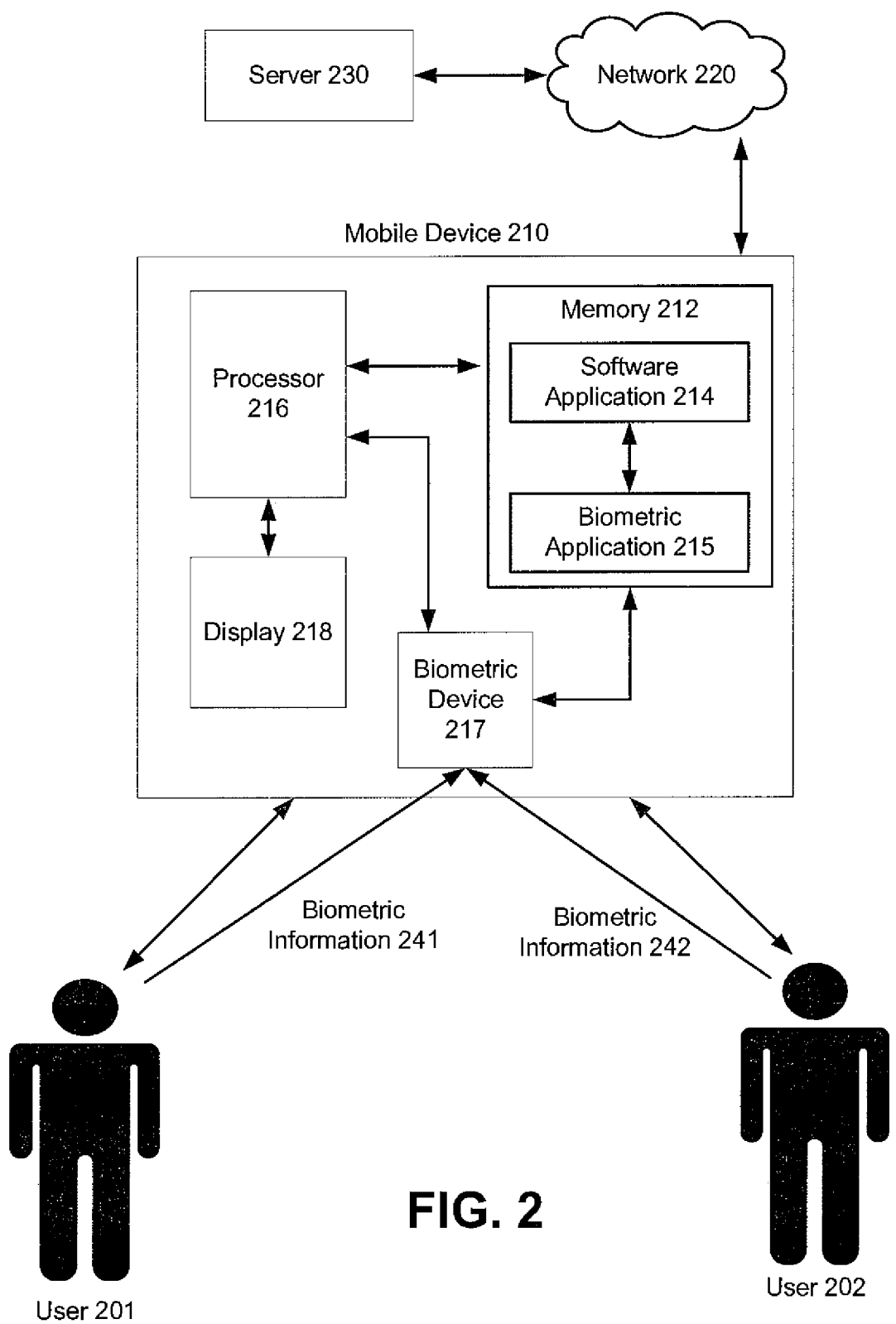
FIG. 2 shows components of a mobile device for use in the system of FIG. 1, according to one implementation of the present disclosure.

Moving now to FIG. 2, FIG. 2 shows a more detailed diagram of mobile device 210, which is similar to mobile device 110 of FIG. 1, according to one implementation of the present disclosure. As shown in FIG. 2, mobile device 210 includes processor 216, memory 212, biometric device 217 and display 218. Processor 216 may be any microprocessor or a similar hardware processor used in a computing device. According to FIG. 2, processor 216 may access memory 212 to store received input or to execute commands, processes, or programs stored in memory 212. Memory 212 is a non-transitory hardware storage device capable of storing commands, processes, and programs, such as software applications, for execution by processor 216.

Display 218 may be any hardware display of a user device, such as a computer display, a tablet computer display, a display of a smart phone, or any other display suitable for displaying digital content including a user interface of a software application.

Memory 212 includes software application 214, which may be executed by processor 216 for conducting multi-user interactions. Software application 214 may also be executed by processor 216 to present a user interface generated by software application 214 on display 218 for use by a plurality of users for performing multi-user interactions. In some implementations, software application 214 may be a gaming application, a social networking application, a content sharing application or an electronic payment sharing application.

Memory 212 may also include biometric application 215 for receiving and storing biometric information of a plurality of users. In one implementation, software application 214 may require verification of the identity of one or more users for performing a particular action requested by a user. In such an implementation, software application 214 may send a request to biometric application 215 to obtain biometric information from user 201 and user 202. Biometric application then uses biometric device 217 to obtain biometric information of user 201 and user 202. In one implementation, software application 214 may be configured to perform the functions of biometric application 215 and use biometric device 217 to obtain biometric information of users.

Biometric device 217 may be any device capable of obtaining and processing biometric information from a user. In some implementations, biometric device 217 may be a device enabled for obtaining physiological characteristics of a user including fingerprint, palm print, hand geometry, iris, retina, voice, face, or palm veins. After biometric device 217 obtains biometric information 241 and biometric information 242 from user 201 and user 202, respectively, biometric device 217 stores biometric information 241 and biometric information 242 in memory 212 for use by software application 214. Although FIG. 2 depicts biometric device 217 as an internal component of mobile device 210, in other implementations, biometric device 217 may be an external component connected to mobile device 210.

Turning to FIG. 3, FIG. 3 presents flowchart 300 illustrating a method of conducting multi-user interactions on mobile device 210 using biometric authentication. Flow chart 300 begins, at step 305, with mobile device 210 launching software application 214 stored in memory 212 using processor 216. After software application 214 is launched, user 201 may request software application 214 to perform an action involving user 201 and user 202 using mobile device 210.

In one implementation, software application 214 may be an electronic payment sharing application for processing a payment transaction. In such an implementation, a plurality of users, including user 201 and user 202, may be at a restaurant and desire to each pay for a portion of the check. After launching software application 214 at 305, software application 214 may present various interface options for payment processing using a user interface on display 218. In one implementation, software application 214 may present an interface option to allow the plurality of users to split a payment using mobile device 210. User 201 may then select this interface option and request that the payment be shared between the plurality of users, including user 201 and 202.

In another implementation, software application 214 may be a social networking application, where user 201 may wish to be connected to user 202 in a social network. In yet another implementation, software application 214 may be a gaming application, where user 201 may wish to exchange a virtual item with user 202. For instance, user 201 and user 202 may be playing a multiplayer online military game, and user 201 may request troops or an extra life from user 202. In another implementation, software application 214 may be a content sharing application, where user 201 may request video, audio, pictures, documents and other types of content from user 202.

In each of the implementations above, in order to securely perform the request by user 201, software application 214 is configured to require the identities of user 201 and user 202 to be verified. As a result, software application 214 may send a request to biometric application 215 to obtain biometric information 241 and biometric information 242 from user 201 and user 202, respectively. In response to this request, biometric application 215 may be launched and present a notification, on the user interface of mobile device 210, to user 201 and user 202 that their biometric information is required before proceeding.

In some implementations, rather than requesting biometric information, software application 214 may request a user identifier such as a pin code. In other implementations, user 202 may have a key fob (or any physical object such as a mobile device belonging to user 202) containing a wireless device capable of sending and receiving wireless signals to mobile device 210. In such an implementation, software application 214 may be configured to detect wireless signals from the key fob, where receiving such wireless signals indicate the presence of user 202 and, therefore, provide a means for verifying the identity of user 202. For instance, user 201 may request that a payment transaction be completed on mobile device 210 belonging to user 201. As user 202 is in proximity of user 201 and mobile device 210, the key fob of user 202 may once or periodically send wireless signals to mobile 210 providing identification information for authenticating user 202. Once mobile device 210 receives the identification information, using a wireless device of mobile device 210, software application 214 may verify and authenticate the identity of user 202. As an additional level of security, after receiving the identification information, software application 214 may also request user 202 to manually input a user identifier before completing the identity verification process for user 202.

At 310, mobile device 210 receives biometric information 241 and biometric information 242 from user 201 and user 202, respectively. Biometric information may be any physiological characteristic of these users including, fingerprint, palm print, hand geometry, iris, retina, voice, face, palm veins, etc. In one implementation, in addition to receiving the biometric information of user 201 and user 202, mobile device 210 may also receive a user identifier from each of user 201 and user 202. A user identifier may be a name, date of birth, social security number, pin code, a user identification generated by software application 214, a government-issued identification number, etc.

At 315, mobile device 210 sends biometric information 241 and biometric information 242 for identification verification to server 230 over network 220. In one implementation, server 230 includes a database of user profiles containing biometric information of a plurality of users, including user 201 and user 202. Such user profiles may include a user identifier including a name, date of birth, social security number, pin code, a government-issued identification number, user identification generated by software application 214, as well as other information including credit card information, bank account information, address, etc.

After receiving biometric information 241 and biometric information 242, server 230 then conducts a search in the database of user profiles containing biometric information for a plurality of users. In the implementation where in addition to the biometric information mobile device 210 also send user identifiers from user 201 and user 202 to server 230, server 230 may conduct a search in the database of user profiles using the user identifiers. If user profiles for user 201 and user 202 are found, server 230 may then compare the biometric information stored in each of the corresponding user profiles with biometric information 241 and biometric information 242 to verify the identities of user 201 and user 202, respectively.

At 315, in one implementation, mobile device 210 may include a database of user profiles for a plurality of users, including user 201 and/or user 202. In such an implementation, after obtaining biometric information 241 and biometric information 242, software application 214 may first conduct a search within the database of user profiles stored in memory 212 to find biometric information corresponding to biometric information 241 and biometric information 242. If software application 214 finds user profiles containing biometric information matching the biometric information obtained from user 201 and user 202, software application 214 may verify the identities of user 201 and user 202. However, if software application 214 does not find user profiles corresponding to user 201 and/or user 202, software application 214 may send biometric information 241 and/or biometric information 242 to server 230 for verification.

As an example, mobile device 210 may belong to user 201, in which case user 201 may have a user profile including biometric information of user 201 stored in memory 212. In that case, identity verification for user 201 is performed by software application 214 on mobile device 210 by comparing biometric information 241 with the biometric information in the user profile for user 201 stored in memory 212. However, user 202 may not have a user profile stored in memory 212. In that case, software application 214 sends biometric information 242 to server 230 for verifying the identity of user 202.

At 320, mobile device 210 receives a first notification from the server as to whether biometric information 241 of user 201 matched a corresponding biometric information in a user profile of user 201 stored in server 230. The first notification may indicate that a match was found between biometric information 241 and the corresponding biometric information in the user profile of user 201, in which case the identity of user 201 has been verified. Alternatively, the first notification may indicate that a match was not found, in which case software application 214 will refrain from performing the action requested by user 201 and may present on display 218 a message that a match was not found.

At 325, mobile device 210 receives a second notification from the server as to whether biometric information 242 of user 202 matched a corresponding biometric information in a user profile of user 202 stored in server 230. Similar to the process described above relating to user 201, the second notification may indicate that a match was found between biometric information 242 and the corresponding biometric information in the user profile of user 202, in which case the identity of user 202 has been verified. Alternatively, the second notification may indicate that a match was not found, in which case software application 214 will refrain from performing the action requested by user 201 and may present on display 218 a message that a match was not found. In one implementation, server 230 may send one notification including the verification results at 315 and 320.

Next, at 330, mobile device 210 proceeds with performing the requested action if the first notification indicates that biometric information 241 matched the first corresponding biometric information and the second notification indicates that biometric information 242 matched the second corresponding biometric information. In addition, in some implementations, software application 214 may be configured to maintain a record of a multi-user interactions in memory 212 after the completion of the requested action.

For example, where software application 214 is an electronic payment sharing application, software application 214 proceeds with processing a payment transaction for user 201 and user 202, where each user pays a portion of the payment amount corresponding to the payment transaction. Prior to processing the payment, software application 214 may present on display 218 a user interface that allows user 201 and user 202 to input their approval and authorize the requested action. For instance, using software application 214, user 201 may request that each user pays $50 towards the check. The user interface may then show the amount that each user needs to pay as well as the bank account that will be used to make the payment for each user. As such, after the identities of user 201 and user 202 have been verified and before proceeding with the request by user 201, user 201 and user 202 may have an opportunity to approve the amount and authorize the payment using mobile device 210.

In another example, software application 214 may be a social networking application. In such an implementation, once the identities of user 201 and user 202 have been verified, software application 214 may proceed with allowing user 201 and user 202 to connect in the social network. In yet another example, software application 214 may be a gaming application, and where user 201 has requested troops or an extra life in a multiplayer online military game, software application 214 may grant the request by providing troops or an extra life.

As another example, software application 214 may be a content sharing application. In that implementation, where user 201 has requested a particular content, such as a video clip, from user 202, software application 214 may grant the request by providing the video clip to user 201 or providing a link to user 201 allowing user 201 to download the video clip.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of splitting a payment between a first user and a second user with a software application of a mobile device having a biometric application to obtain biometric information, the mobile device storing a first user profile of the first user but not a second user profile of the second user, the method comprising:
   receiving, by the software application, a payment processing request;
   in response to receiving the payment processing request, launching the biometric application by sending a biometric request from the software application to the biometric application;
   obtaining, by the biometric application, in response to the biometric request, first biometric information of the first user and second biometric information of the second user;
   verifying, by the software application, that the first biometric information of the first user matches a first user biometric information in the first user profile of the first user;
   sending, by the software application, the second biometric information of the second user to a server;
   receiving, by the software application, in response to the sending, a notification from the server, the notification including a match determination between the second biometric information of the second user and a second user biometric information in the second user profile of the second user; and
   processing the payment, by the software application, by splitting the payment between the first user and the second user, based on the verifying of the first biometric information of the first user by the mobile device and receiving the notification including the match determination from the server.

2. The method of claim 1 further comprising:
   presenting, by the software application, a user interface on a display of the mobile device; and
   showing, la the user interface, a first account of the first user and a second account of the second user.

3. The method of claim 1, the first user profile includes first credit card information, and the second user profile includes second credit card information.

4. The method of claim 1, wherein prior to processing the payment, the method further comprising:
   presenting, by the software application, a user interface on a display of the mobile device; and
   receiving, by the software application via the presented user interface, a first input from the first user and a second input from the second user, and based on the received inputs approving by the software application splitting of the payment between the first user and the second user.

5. The method of claim 1 further comprising:
   storing, by the software application, a record of splitting the payment between the first user and the second user.

6. A mobile device comprising:
   a hardware processor; and
   a memory storing a first user profile of the first user but not a second user profile of the second user, the memory further storing a biometric application and a software application including processor executable instructions that when executed by the hardware processor cause the hardware processor to perform;

receiving, via the software application, a payment processing request;

in response to receiving the payment processing request, launching the biometric application by sending a biometric request from the software application to the biometric application;

obtaining, via the biometric application, in response to the biometric request, first biometric information of the first user and second biometric information of the second user;

verifying, via the software application, that the first biometric information of the first user matches a first user biometric information in the first user profile of the first user;

sending, via the software application, the second biometric information of the second user to a server;

receiving, via the software application, in response to the sending, a notification from the server, the notification including a match determination between the second biometric information of the second user and a second user biometric information in the second user profile of the second user; and processing the payment, via the software application, by splitting the payment between the first user and the second user, based on the verifying of the first biometric information of the first user by the mobile device and receiving the notification including the match determination from the server.

7. The mobile device of claim 6, wherein the memory includes additional further executes the processor executable instructions that when executed by the hardware processor cause the hardware processor to perform:

presenting, via the software application, a user interface on a display of the mobile device; and showing, via the user interface, a first account of the first user and a second account of the second user.

8. The mobile device of claim 6, the first user profile includes first credit card information, and the second user profile includes second credit card information.

9. The mobile device of claim 6, wherein additional processor executable instructions that when executed by the hardware processor cause the hardware processor to perform:

presenting, via the software application and prior to processing the payment, a user interface on a display of the mobile device; and receiving, via the presented user interface, a first input from the first user and a second input from the second user, and based on the received inputs approving via the software application splitting of the payment between the first user and the second user.

10. The mobile device of claim 6, wherein the memory includes additional processor executable instructions that when executed by the hardware processor cause the hardware processor to perform:

storing, via the software application, a record of splitting the payment between the first user and the second user.

* * * * *

UNITED STATES PATENT AND TRADEMARK OFFICE
CERTIFICATE OF CORRECTION

PATENT NO. : 10,853,773 B2
APPLICATION NO. : 14/797783
DATED : December 1, 2020
INVENTOR(S) : Feder et al.

Page 1 of 1

It is certified that error appears in the above-identified patent and that said Letters Patent is hereby corrected as shown below:

In the Claims

Column 6, Line 46, "showing, la the user interface, a first account of the first" should be -- showing, by the user interface, a first account of the first --

Column 8, Lines 1 – 2, "The mobile device of claim 6, wherein the memory includes additional further executes the processor executable" should be -- The mobile device of claim 6, wherein the memory includes additional processor executable --

Signed and Sealed this
Second Day of February, 2021

Drew Hirshfeld
*Performing the Functions and Duties of the
Under Secretary of Commerce for Intellectual Property and
Director of the United States Patent and Trademark Office*